Figure 1:
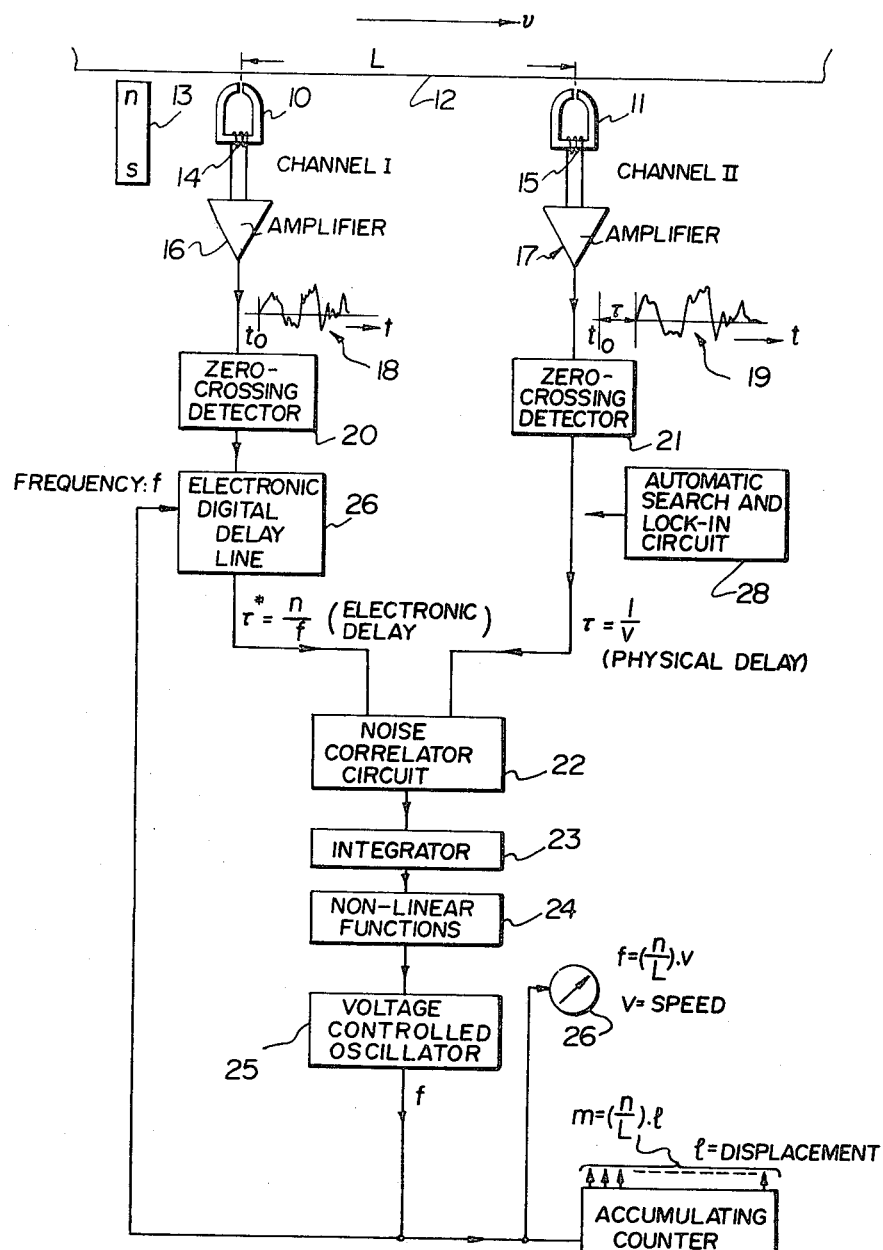

United States Patent

Zwarts

[11] 4,317,077
[45] Feb. 23, 1982

[54] TRANSDUCER FOR MEASURING THE VELOCITY OR DISPLACEMENT OR BOTH OF FERROMAGNETIC MATERIAL

[75] Inventor: Cornelis M. G. Zwarts, Touraine, Canada

[73] Assignee: Canadian Patents & Development Limited, Ottawa, Canada

[21] Appl. No.: 133,412

[22] Filed: Mar. 24, 1980

[51] Int. Cl.$^3$ .............................................. G01P 3/66
[52] U.S. Cl. ..................................... 324/179; 324/166
[58] Field of Search ............... 324/179, 166, 174, 228, 324/173; 73/519, 518; 340/670; 361/236, 240; 246/77, 249, 182 R

[56] References Cited

U.S. PATENT DOCUMENTS

| 3,436,656 | 4/1969 | Brand, Jr. ................... 246/182 R X |
| 3,582,924 | 6/1971 | Kanagawa-ken et al. ..... 324/172 X |
| 3,728,565 | 4/1973 | O'Callaghan ................. 324/173 X |

FOREIGN PATENT DOCUMENTS

1311279 10/1962 France ............................. 324/179

*Primary Examiner*—Stanley T. Krawczewicz
*Attorney, Agent, or Firm*—James R. Hughes

[57] ABSTRACT

A transducer for measuring the velocity and displacement of ferromagnetic materials comprising first and second magnetic read-heads positioned close to but not contacting the magnetic element whose velocity is to be measured with the two read-heads located a fixed distance apart in the direction of travel of the element, magnetic means positioned close to the magnetic element ahead of the first and second read-heads in the direction of travel of the magnetic element for increasing the magnetic surface noise levels of the material or the magnetic element, amplifiers connected to the two read-heads for amplifying the random voltage noise signals induced in the read-heads, said signals being substantially identical with one being delayed in time with respect to the other, zero-crossing detectors connected to the outputs of the amplifiers, means for correlating the noise signals obtained from the zero-crossing detectors and providing an output frequency signal, an electronic digital delay line circuit connected between the zero-crossing detector of the first read-head and the means for correlating the noise signals, feedback means for applying the output frequency signal to the electronic digital delay line circuit to control the amount of delay such that it is equal to the physical delay produced in the signal from the second read-head, said delay being related to the velocity of the magnetic element, and means for measuring the frequency or number or both of the cycles of the output frequency signal to give an indication of the relative velocity or displacement or both of the magnetic element.

4 Claims, 1 Drawing Figure

TRANSDUCER FOR MEASURING THE VELOCITY OR DISPLACEMENT OR BOTH OF FERROMAGNETIC MATERIAL

This invention relates to a transducer for measuring the velocity and displacement of ferromagnetic materials.

There have been many approaches to the measurement of the velocity of moving ferromagnetic elements such as tapes, steel strip, railway wheels etc. The following are patents obtained on some typical apparatus of this kind:

| | | |
|---|---|---|
| 3,281,593 | H. Mendelsoln | October 25, 1966 |
| 3,440,532 | Kwangh O Chung | April 22, 1969 |
| 3,462,675 | Pivovarov et al | August 19, 1969 |
| 3,721,859 | C. G. Blanyer | March 20, 1973 |
| 3,920,024 | R. G. Wise | June 25, 1974 |
| 3,829,893 | J. R. Baichtal | August 13, 1974 |
| 4,093,917 | W. Hauessermann | June 6, 1978 |

It is an object of the present invention to provide a transducer for measuring the velocity of a moving ferromagnetic element that is non-contacting and has high resolution.

The and other objects of the invention are achieved by a transducer comprising first and second magnetic read-heads positioned close to but not contacting the magnetic element whose velocity is to be measured with the two read-heads located a fixed distance apart in the direction of travel of the element, magnetic means positioned close to the magnetic element ahead of the first and second read-heads in the direction of travel of the magnetic element for increasing the magnetic surface noise levels of the material or the magnetic element, amplifiers connected to the two read-heads for amplifying the random voltage noise signals induced in the read-heads, said signals being substantially identical with one being delayed in time with respect to the other, zero-crossing detectors connected to the outputs of the amplifiers, means for correlating the noise signals obtained from the zero-crossing detectors and providing an output frequency signal, an electronic digital delay line circuit connected between the zero-crossing detector of the first read-head and the means for correlating the noise signals, feedback means for applying the output frequency signal to the electronic digital delay line circuit to control the amount of delay such that it is equal to the physical delay produced in the signal from the second read-head, said delay being related to the velocity of the magnetic element, and means for measuring the frequency or number or both of the cycles of the output frequency signal to give an indication of the relative velocity or displacement or both of the magnetic element.

In drawings which illustrate an embodiment of the invention,

FIG. 1 is a schematic flow diagram of the transducer.

Referring to FIG. 1, two magnetic read-heads 10 and 11 are positioned in close proximity but non-contacting the surface of a moving strip or element of ferromagnetic material 12 having a velocity "v" in relation to the read-heads which are separated in the travel direction by a distance "L". The two read-heads have induced in their coils the "magnetic surface noise" of the ferromagnetic material. However the resultant inherent noise voltages are too small to be very useful. A small magnet (or electromagnet) 13 is positioned upstream of the two read-heads and this very substantially increases the "magnetic surface noise" amplitude to a level where it is well above the electronic noise levels of very sensitive pre-amplifiers 14 and 15 connected to the coils 16 and 17 of the read-heads.

Ideally, the random voltage noise signals 18 and 19 measured by the two heads are identical except for a certain time delay "$\tau$" which is determined by the speed "v" of the surface and the distance "L" between the heads. The output of the amplifiers 16 and 17 are passed to zero-crossing detectors 20 and 21 and then to noise correlator circuit 22, integrator 23, and non-linear functions circuit 24. These circuits produce in effect a voltage error signal that is converted to a frequency signal "f" by the voltage controlled oscillator 25. This is introduced (fed back) into one channel i.e. into electronic digital delay line 26 which is effective to produce an electronic digital delay "$\tau^*$" which is kept exactly equal to the physical delay "$\tau$" of the other channel.

Hence $\tau^* = \tau$ or $n/f = L/v$ and $v = L/n \cdot f$ where v = surface speed
L = distance between heads
n = number of stages in electronic digital delay
f = frequency activating the electronic delay and measured in frequency meter 26.

The displacement "l" is obtained by digitally integrating the clock signal in counter 27.

Each clock period represents a displacement (L/n); therefore, a digital number "m" accumulated in the counter represents the total displacement "l", hence $l = m \cdot (L/n)$.

The non-linear functions circuit 24 controls the bandwidth of the transducer (without 24 the bandwidth decreases with increasing speed which is definitely not desirable).

Two non-linear functions are particularly useful, an exponential function, $E_{out} = e^{-E_{in}}$, results in constant bandwidth, the function, $E_{out} = E_{in}^{-1}$, produces a bandwidth proportional to the speed v. Circuits for achieving these functions are known and readily available.

The automatic search and lock-in circuit 28, at start-up, searches automatically for the locked-in conditions for the loop and keeps continuously monitoring this condition to require lock-in if so required.

I claim:

1. A transducer for measuring the velocity or displacement or both of ferromagnetic material comprising:
   (a) first and second magnetic read-heads positioned close to but not contacting the magnetic element whose relative velocity or displacement or both is to be measured with the two read-heads located a fixed distance apart in the direction of travel of the element,
   (b) magnetic means positioned close to the magnetic element ahead of the first and second read-heads in the direction of travel of the element for increasing the magnetic surface noise levels of the material of the magnetic element, (c) amplifiers connected to the two read-heads for amplifying the random voltage noise signals induced in the read-heads, said signals being substantially identical with one being delayed in time with respect to the other, (d) zero-crossing detectors connected to the outputs of the amplifiers, (e) means for correlating the noise signals obtained from the zero-crossing detectors and providing an output frequency signal, (f) an electronic digital delay line circuit connected between the zero crossing detector of the first read-head and the means for correlating the noise signals, (g) feedback means for applying the output frequency signal to the electronic digital delay line circuit to control the amount of delay such that it is equal to the physical delay produced in the signal from the second read-head, said delay being relative to the velocity of the magnetic element, and (h) means for measuring the frequency or number of both of the cycles of the output frequency signal to give an indication of the relative velocity or displacement or both of the magnetic element.

2. A transducer for measuring the velocity or displacement or both of ferromagnetic material as in claim 1 wherein the means for correlating the noise signals and providing on output frequency signal comprises a correlation circuit providing an output related to time delay differences between the two inputs from the zero-crossing detectors, means for integrating said output to provide a DC error signal, a non-linear function generator to modify said error signal, and a voltage controlled oscillator to change the DC error signal to a frequency.

3. A transducer as in claim 2 wherein the non-linear function generator modifies the error signal according to the function $E_{out} = E^{-E} in$.

4. A transducer as in claim 2 wherein the non-linear function generator modifies the error signal according to the function $E_{out} = E_{in}^{-1}$.

* * * * *